(12) United States Patent
Luecking

(10) Patent No.: US 12,737,704 B2
(45) Date of Patent: Sep. 15, 2026

(54) SYSTEMS AND METHODS FOR STATUS CHANGE

(71) Applicant: SAP SE, Walldorf (DE)

(72) Inventor: Thomas Luecking, Bruchsal (DE)

(73) Assignee: SAP SE, Walldorf (DE)

( * ) Notice: Subject to any disclaimer, the term of this patent is extended or adjusted under 35 U.S.C. 154(b) by 54 days.

(21) Appl. No.: 18/424,140

(22) Filed: Jan. 26, 2024

(65) Prior Publication Data

US 2025/0245593 A1 Jul. 31, 2025

(51) Int. Cl.
*G06Q 10/00* (2026.01)
*G06F 3/0482* (2013.01)
*G06F 3/04847* (2022.01)
*G06Q 10/0631* (2023.01)

(52) U.S. Cl.
CPC ..... *G06Q 10/06316* (2013.01); *G06F 3/0482* (2013.01); *G06F 3/04847* (2013.01)

(58) Field of Classification Search
None
See application file for complete search history.

(56) References Cited

U.S. PATENT DOCUMENTS 6,326,962 B1 * 12/2001 Szabo .................. G06F 16/248 707/E17.082
7,574,483 B1 * 8/2009 Alger ..................... G06Q 10/06 709/217
7,774,742 B2 * 8/2010 Gupta .................... G06Q 10/06 717/102
8,027,861 B2 * 9/2011 Brintle ............. G06Q 10/06311 709/219
8,799,824 B1 * 8/2014 Chien ..................... G06F 11/34 715/764
9,773,216 B2 * 9/2017 Bain .................... G06Q 10/063
11,720,838 B2 * 8/2023 Jafari .................... G06F 3/0482 705/7.17
11,775,745 B2 * 10/2023 Pelz ...................... G06F 16/211 715/227
2006/0107265 A1 * 5/2006 Schulz .................. G06Q 10/06 718/100
2006/0143270 A1 * 6/2006 Wodtke ................ G06Q 10/107 709/206
2006/0168582 A1 * 7/2006 Muller .................. G06Q 10/10 718/100
2007/0282658 A1 * 12/2007 Brintle .......... G06Q 10/063114 705/7.15

(Continued)

OTHER PUBLICATIONS

KS Lee et al. (Kernel-adaptor interface testing of Project Timeliner)—1995—dspace.mit.edu (Year: 1995).*

*Primary Examiner* — Hafiz A Kassim
(74) *Attorney, Agent, or Firm* — Buckley, Maschoff & Talwalkar LLC

(57) ABSTRACT

According to some embodiments, systems and methods are provided including a memory storing processor-executable program code; and a processing unit to execute the processor-executable program code to cause the system to: select an element from a plurality of elements, wherein each element includes one or more configurable parameters; configure each parameter for the selected element; apply the configured element to a task in a task list; and display the parameters on a user interface display based on the applied configured element. Numerous other aspects are provided.

20 Claims, 17 Drawing Sheets

(56) References Cited

U.S. PATENT DOCUMENTS

2009/0228831 A1* 9/2009 Wendker .................. G06F 8/38 715/810
2009/0307035 A1* 12/2009 Steinglass ............. G06Q 10/06 705/7.22
2010/0125814 A1* 5/2010 Lemons .......... G06Q 10/06316 705/7.26
2010/0146427 A1* 6/2010 Schubert ............... G06Q 10/06 715/771
2011/0264593 A1* 10/2011 Gaisford ............. G06Q 10/103 715/810
2012/0060166 A1* 3/2012 Jardine ............... G06Q 10/109 718/104
2012/0116834 A1* 5/2012 Pope ............... G06Q 10/06316 705/7.26
2017/0103357 A1* 4/2017 Numata ............ G06Q 10/0635
2021/0073713 A1* 3/2021 Balasubramanian ....................... G06Q 10/06312
2022/0147893 A1* 5/2022 Malviya ............... H04L 63/102
2022/0215329 A1* 7/2022 Jafari ................... G06F 3/0482

* cited by examiner

600

STATUS CHANGE EXPLANATION TOOL – PRE-EXISTING SCENARIO

Back · Search · Favorites · Media

602

220

| Status Change Explanation Scenario | Customer 604 | What | Task Status Change (Value) 610 | | | Task Status Change (Condition) 612 | Approval Status Change 614 | |
|---|---|---|---|---|---|---|---|---|
| | | | Completed without Errors | Completed with Errors | [...] | Delayered | Approve 614a | Rejected 614b |
| Hidden | 606 | Reason Code | None (hidden) | Mandatory | None (hidden) | None (hidden) | None (hidden) | None (hidden) |
| | 608 | Comment | None (hidden) | Optional | None (hidden) | None (hidden) | None (hidden) | None (hidden) |
| Only Comment | | Reason Code | None (hidden) | None (hidden) | None (hidden) | None (hidden) | None (hidden) | None (hidden) |
| | | Comment | Optional | Optional | Optional | Optional | Optional | Optional |
| Optional | XYZ Bank | Reason Code | Optional | Optional | Optional | Optional | Optional | Optional |
| | | Comment | Optional | Optional | Optional | Optional | Optional | Optional |
| Mandatory (DEFAULT-Current) | | Reason Code | None (hidden) | None (hidden) | None (hidden) | None (hidden) | None (hidden) | None (hidden) |
| | | Comment | Mandatory | Mandatory | Mandatory | Mandatory | Mandatory | Mandatory |
| Mandatory-ALL | | Reason Code | Mandatory | Mandatory | Mandatory | Mandatory | Mandatory | Mandatory |
| | | Comment | Mandatory | Mandatory | Mandatory | Mandatory | Mandatory | Mandatory |
| Overdue | ABC Tech Company | Reason Code | Optional | Optional | Optional | Mandatory | Optional | Optional |
| | | Comment | Optional | Optional | Optional | Mandatory | Optional | Optional |
| Severe Status Comment Only | BP | Reason Code | Optional | Optional | Optional | Optional | Optional | Optional |
| | | Comment | Mandatory | Optional | Optional | Optional | Optional | Mandatory |

FIG. 6

SYSTEMS AND METHODS FOR STATUS CHANGE

BACKGROUND

An entity close process may occur at one or more of every month, quarter and year for an organization. During the entity close process, the organization may organize, reconcile and report the financial activities of the organization over the fiscal period. The entity close process may include the execution of a series of routine interrelated and interdependent accounting tasks during the accounting cycle (e.g., month, period, quarter, year, etc.). These entity close tasks may include manual as well as automatic tasks to be executed in a predefined sequence (per the interrelations and interdependencies), including planned starts and durations for each task. The predefined sequence of tasks may be referred to as a "schedule," and may be generated by a task scheduling tool. The predefined interrelations and interdependencies within the schedule ensure that the right sequence for the entity close process is followed. The progress of the execution of the tasks may be tracked via status markers to monitor the status of the entity close process. The status of each task may be set either manually by the users responsible to process the respective task, or may be set automatically by the underlying job executing the task. In the case of manual status changes, a user may have the option, or may be required, to enter a reason for the status change. Conventional task scheduling tools only provide for the status change reason to be entered in a free text field, which is a general field that can accept any type of data in the form of text or numbers. The free text aspect of the status change reason may make it challenging for a user to track the status change reasons and report on the status change reasons because they are all different.

Systems and methods are desired to make it easier to track and report on status change reasons.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 6 is a diagram illustrating a user interface according to some embodiments.

Figure 1:
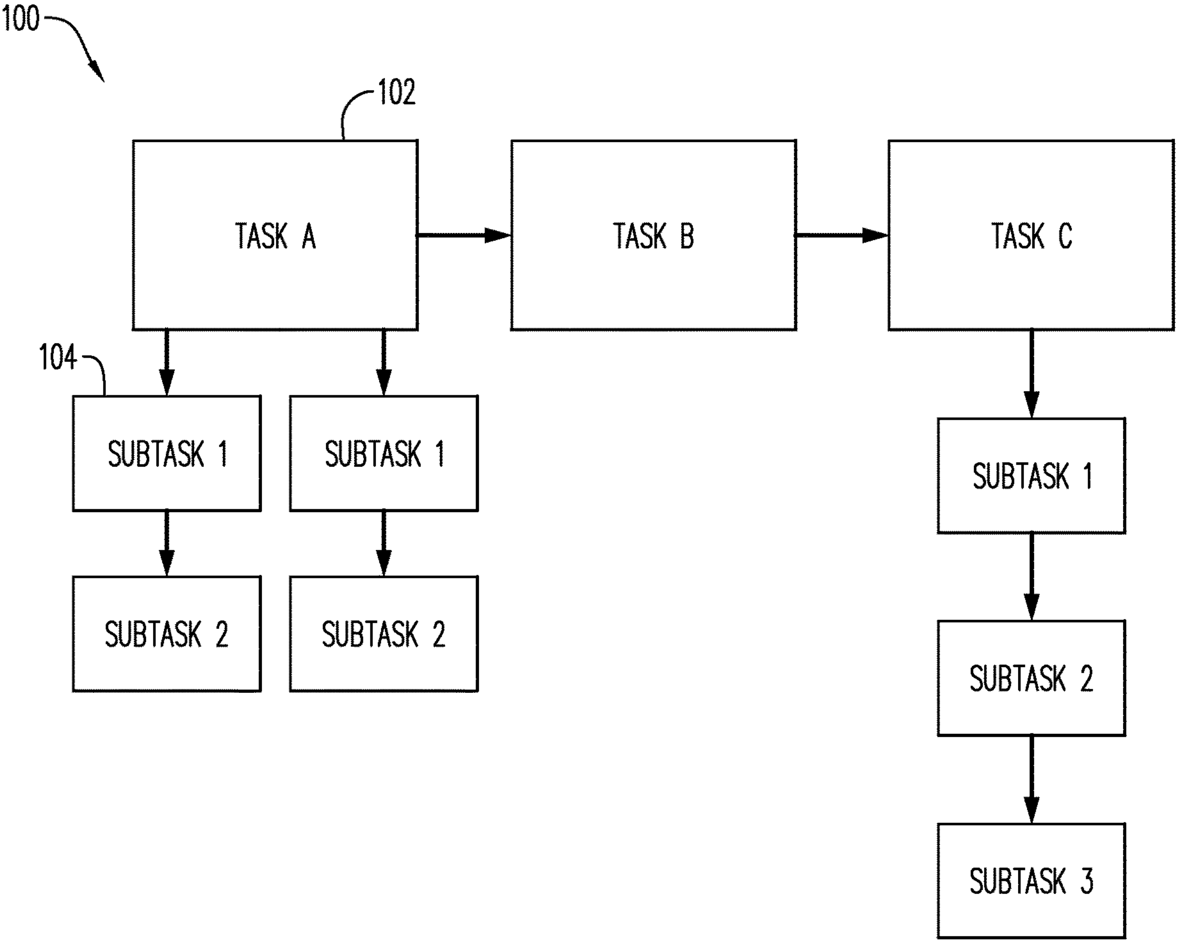
FIG. 1 is a block diagram of a non-exhaustive example of a schedule according to some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, an entity close process includes the execution of a series of routine interrelated and interdependent accounting tasks (processes) during the accounting cycle (e.g., week, month, year, other suitable period (e.g., two weeks), etc.), with the goal of organizing and reconciling the financial activities of the entity as well as generating internal and external financial reports from accurate data. For example, at the end of each calendar month, entity close tasks may include, but are not limited to, tallying up income and revenue, reconciling entity expenses, reviewing bank accounts and statements, preparing key financial statements, generating a profit and loss statement summarizing earnings and spend, generating a balance sheet detailing all assets and liabilities, and generating a cash flow statement recording cash balance and all transactions. A task scheduling tool may schedule the interrelated and interdependent tasks (processes) into a predefined sequence referred to as a "schedule." The tasks may be automatic tasks that may run automatically, such as log files; or may be manual tasks, such as a user confirming certain information in a particular program (e.g., Excel®). As the tasks are executed, they may have a status assigned to them automatically or manually. The status may be, as a non-exhaustive example, "completed without errors" for tasks processed successfully; "completed with warnings" for tasks processed with warnings; and "completed with errors" for tasks processed with errors. In the case of manual status assignment, a user may have the option, or may be required, to enter a reason for the status change. Conventional task scheduling tools only provide for the status change reason to be entered in a free text field, which is a general field that can accept any type of data in the form of text or numbers. Entering data in a free text form aspect for the status change reason may be a time consuming task for a user. The free form aspect may also make it challenging for a user to track the status change reasons and report on the status change reasons because they are all different.

Pursuant to some embodiments, a status change explanation tool provides predefined reason codes and free text reasons as flexible field control elements that may be applied to a manual status change of a scheduled task (process). It is noted that while embodiments may be described herein with respect to an entity close process, the status change explanation tool and description herein may be applied to other processes. It is further noted that the term "status change" may refer to an initial status assignment (e.g., "Not Started"), as well as to a change from a first assigned status to a second assigned status. Execution of a process may include execution of one or more tasks. A status of the execution for each task may be monitored, and the status may be manually updated to reflect a current status of the task. In one or more embodiments, the status may be updated in a change status pop-up window on a user interface. The change status pop-up window may include status change reason codes and free text reasons as field control elements for an end user to indicate why (e.g., provide a reason) they are manually changing the status of a task. The status change reason codes are predefined and may be configured and/or extended by an administrator to later be selected by an end user. Each status change reason code may include at least one of a code, a description (language-dependent) and a type (relevant for APPROVAL, BUSINESS_STATUS, etc.). The status change reason code may provide for consistency checks on deletions of status change reason codes to avoid deletion by an administrator of used status change reason codes. The status change reason codes may also provide for filtering on a status change reason code type (e.g., only show a list of reason codes relevant for approval) during reporting or other analysis. The free text reasons ("status change reason comments") field may receive free-form text from an end user. According to embodiments, and prior to application to one or more tasks, a status change reason code field and/or status change reason comment field may be configured per one or more status change explanation scenario elements ("scenarios") via the status change explanation tool. The scenario may describe how (e.g., hidden or unhidden) the status change reason code field and the status change reason comment field are displayed, the condition (e.g., mandatory, optional, etc.) for their display, and rules (a value is mandatory, optional, etc.) associated with the fields. The scenario, as configured, is independent of any task. After the scenario is configured, the scenario may be applied/assigned to a task (or applied/assigned to one or more groups of two or more tasks). The task may then be executed, in some instances via another system, resulting in a status change. The end user executing the task may then change the status of the task in the change status pop-up window populated based on the assigned configured scenario. The pre-defined and extensible list of reason codes may allow a user to quickly comment on task status changes. The pre-defined and configurable reason codes provide for quick and unified comments for status changes. Embodiments provide for the flexible definition (configuration) of scenarios to define in which instance comments/reason codes are hidden, optional or mandatory. Embodiments also provide for the re-use of scenarios for a unified behavior of the system with maximum flexibility.

FIG. 1 shows an entity close process 100 according to some embodiments. In particular, an organization may have one or more particular tasks 102 that may be executed to complete the entity close process 100. Some tasks 102 may include zero sub-tasks 104, while other tasks 102 include one or more sub-tasks 104. The tasks 102 may be organized in a sequence ("schedule") based on these sub-tasks (e.g., interrelations) and interdependencies between tasks. As a non-exhaustive example, consider the task of a depreciation run. The depreciation close process task may include the sub-task of generating (posting) planned depreciation accounting entries for all depreciable assets active in the system in a given accounting period. Since single asset transactions lead to a change in planned depreciation, but not to a posting to the relevant general ledger accounts, only when the depreciation close process task is executed does the system carry out all depreciations planned up to the specified date. Further, since the asset transactions lead to a change in planned depreciation, the depreciation close process task may be dependent on at least an asset transactions task, which may, in turn, be dependent upon at least a create accounting entries sub-task.

Figure 2:
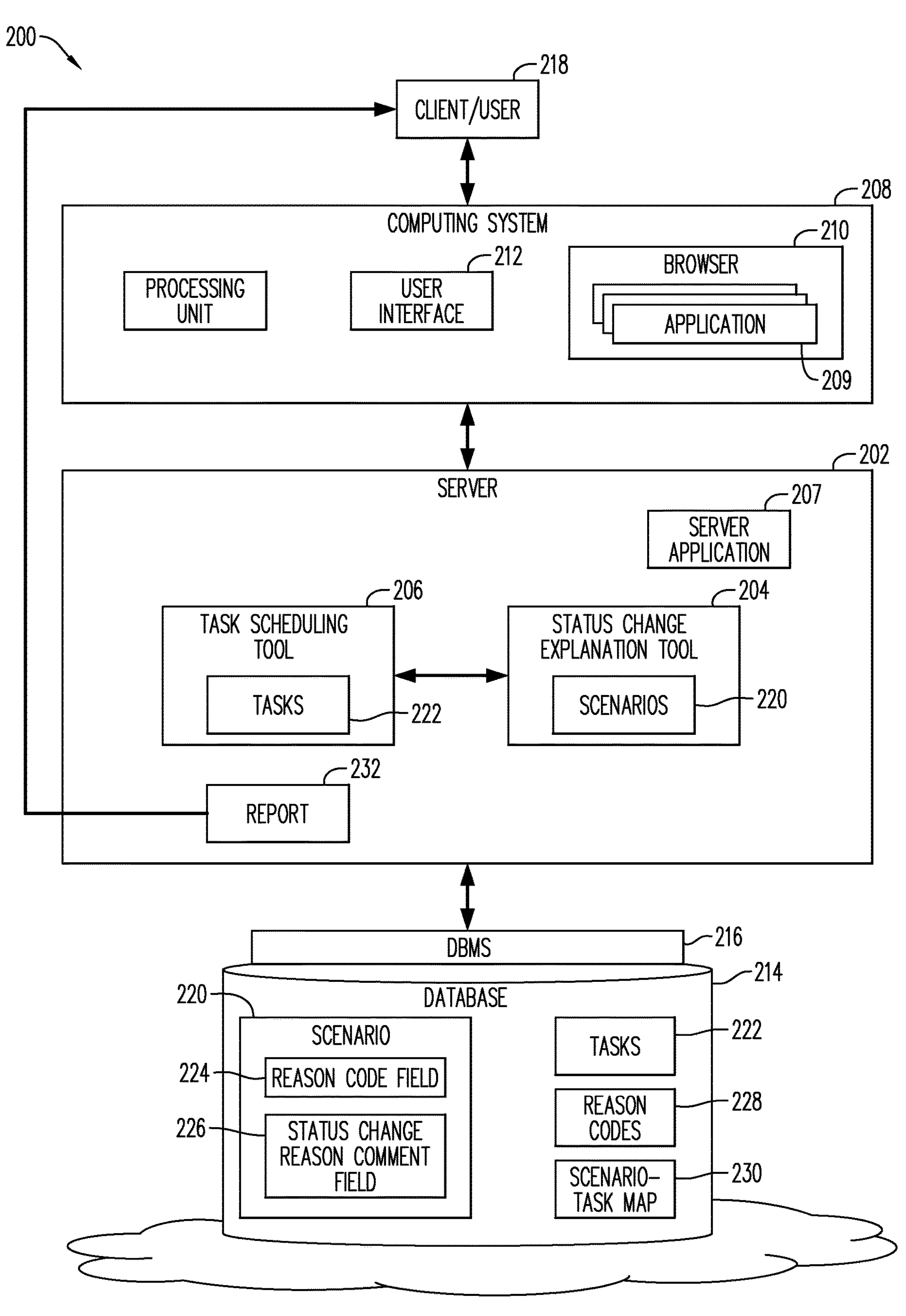
FIG. 2 is a block diagram of an architecture according to some embodiments.

FIG. 2 is a block diagram of an architecture 200 according to some embodiments. The illustrated elements of system architecture 200 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of system architecture 200 are implemented by a single computing device, and/or two or more elements of system architecture 200 are co-located. One or more elements of system architecture 200 may be implemented using cloud-based resources, and/or other systems which apportion computing resources elastically according to demand, need, price, and/or any other metric.

System architecture 200 includes a backend server 202 including a status change explanation tool 204, a task scheduling tool 206, a local computing system 208 including a browser 210 running a client application 209, and user interface 212. System architecture 200 also includes a database 214, a database management system (DBMS) 216, and a client/user 218. As used herein, the terms "client", "user" and "end-user" may be used interchangeably.

The backend server 202 may include server applications 207. Server applications 207 may comprise server-side executable program code (e.g., compiled code, scripts, etc.) executing within the backend server 202 to receive queries/requests from clients/users 218, via the local computing system 208, and provide results to clients/users 218 based on the data of database 214, and the output of the status change explanation tool 204. Server applications 207 may provide functionality (e.g., receiving a request via a drag-and-drop operation, data entry, and then retrieving data from the database 214 based on the request, processing the retrieved data and providing the data via the user interface 212 to clients/users 218).

The backend server 202 may provide any suitable interfaces through which clients/users 218 may communicate with the status change explanation tool 204, task scheduling tool 206, or applications 207/209 executing thereon. The backend server 202 may include a Hyper Text Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface. Backend server 202 may be separated from or closely integrated with DBMS 216. A closely-integrated backend server 202 may enable execution of applications 207 completely on the database platform, without the need for an additional server. For example, backend server 202 may provide a comprehensive set of embedded services which provide end-to-end support for Web-based applications. Backend server 202 may provide application services (e.g., via functional libraries) which applications 207 may use to manage and query the database files stored in the database 214. The application services can be used to expose the database data model, with its tables, hierarchies, views and database procedures, to clients/users 218. In addition to exposing the data model, backend server 202 may host system services such as a search service, and the like.

Local computing system 208 may comprise a computing system operated by local user 218. Local computing system 208 may comprise a laptop computer, a desktop computer, or a tablet computer, but embodiments are not limited thereto. Local computing system 208 may consist of any combination of computing hardware and software suitable to allow local computing system 208 to execute program code to cause the local computing system 208 to perform the functions described herein and to store such program code and associated data.

Generally, local computing system 208 executes one or more of applications 209 to provide functionality to client/user 218. Applications 209 may comprise any software applications that are or become known, including but not limited to entity close applications. As will be described below, applications 209 may comprise web applications which execute within a web browser 210 of local computing system 208 and interact with corresponding server applications 207 to provide desired functionality. The client application 209 may send a user interface request (or other suitable request) to a server-side or back-end application ("server application") 207 for execution thereof. For example, when a user clicks on a button or enters information via a UI of the client application 209, a request is sent to the backend server 202. The backend server then responds with what needs to be rendered/content that is then provided to the client application. The user 218 may interact with the resulting displayed user interface 212 output from the execution of applications, to configure a change status pop-up window and/or execute a status change update via the change status pop-up window.

The client/user 218 may access the status change explanation tool 204 executing within the backend server 202 to configure the scenarios 220 that are applied to reason codes and reason comments in a pop-up window for status changes ("change status pop-up window") for one or more applied/assigned tasks. The client/user 218 that configures the scenarios 220 may be an administrator or other suitable user. The status change explanation tool 204 may provide one or more pre-defined scenarios 220 and may provide for the creation of one or more scenarios 220. The status change explanation tool 204 may provide rules for the presentation of status change reason codes and status change reason comments for each scenario, and rules for the requirements of status change reason codes and status change reason comments for each scenario. The presentation and requirements of the status change reason codes and status change reason comments may be non-exhaustive examples of configuration parameters. As a non-exhaustive scenario configuration example, a "hidden" scenario means that a status change reason code field and/or a status change reason comment field may be hidden (not visible) on the change status pop-up window. The "hidden" scenario may be configured, for example, to be applicable in a case the status change is "Completed Without Errors." In this example, the configuration of the "hidden" scenario may have the status change reason code field selected to be "hidden" and the status change reason comment code field selected to be "hidden" for the "Completed without Errors" task status change value. Continuing with the "hidden" scenario, for the "Completed with Errors" task status change value, the "hidden" scenario may be configured to have the status change reason code field selected as "Mandatory" and the status change reason comment code field selected as "Optional" such that these fields are present (unhidden) on the change status pop-up window in a case the status change value is "Completed with Errors", and a user is required to enter a reason code per the "Mandatory" requirement and is not required to enter a status change reason comment code per the "Optional" requirement.

After configuration, the scenarios 220 may be mapped to one or more tasks 222 in a task list provided by the task scheduling tool 206. The task scheduling tool 206 may plan, execute, monitor and control the entire period-end closing cycle. Non-exhaustive examples of task scheduling tools are SAP Financial Closing Cockpit® and SAP S/4HANA Cloud for advanced financial Closing®.

The status change explanation tool 204 may access data in the database 214 and retrieve the data so that it is provided at runtime. While discussed further below, the database 214 may store data representing scenarios 220 and tasks 222 and other suitable data. Selection of configuration parameters for a given scenario and mapping of the scenario to one or more tasks may result in the retrieval of scenario information (reason code field 224, status change reason comment field 226 for the given scenario) and reason code values 228 from the database 214 and presentation of this information on the change status pop-up window user interface, as described further below. Database 214 represents any suitable combination of volatile (e.g., Random Access Memory) and non-volatile (e.g., fixed disk) memory used by the system to store the data.

One or more applications 207/209 executing on backend server 202 or local computing system 208 may communicate with DBMS 216 using database management interfaces such as, but not limited to, Open Database Connectivity (ODBC) and Java Database Connectivity (JDBC) interfaces. These types of applications 207/209 may use Structured Query Language (SQL) to manage and query data stored in database 214.

DBMS 216 serves requests to store, retrieve and/or modify data of database 214, and also performs administrative and management functions. Such functions may include snapshot and backup management, indexing, optimization, garbage collection, and/or any other database functions that are or become known. DBMS 216 may also provide application logic, such as database procedures and/or calculations, according to some embodiments. This application logic may comprise scripts, functional libraries and/or compiled program code. DBMS 216 may comprise any query-responsive database system that is or becomes known, including but not limited to a structured-query language (i.e., SQL) relational database management system.

Database 214 may store data used by at least one of: applications 207/209, the status change explanation tool 204 and the task scheduling tool 206. For example, database 214 may store the configuration data mapped to a particular task, which may be accessed by the status change explanation tool 204 and the task scheduling tool 206 during execution thereof.

Database 214 may comprise any query-responsive data source or sources that are or become known, including but not limited to a structured-query language (SQL) relational database management system. Database 214 may comprise a relational database, a multi-dimensional database, an extensible Markup Language (XML) document, or any other data storage system storing structured and/or unstructured data. The data of database 214 may be distributed among several relational databases, dimensional databases, and/or other data sources. Embodiments are not limited to any number or types of data sources.

Presentation of a user interface as described herein may comprise any degree or type of rendering, depending on the type of user interface code generated by the backend server 202/local computing system 208.

For example, the client/user 218 may execute the browser 210 to request and receive a Web page (e.g., in HTML format) from a server application 207 of backend server 202 to provide the user interface 212 via HTTP, HTTPS, and/or WebSocket, and may render and present the Web page according to known protocols.

Figure 3:
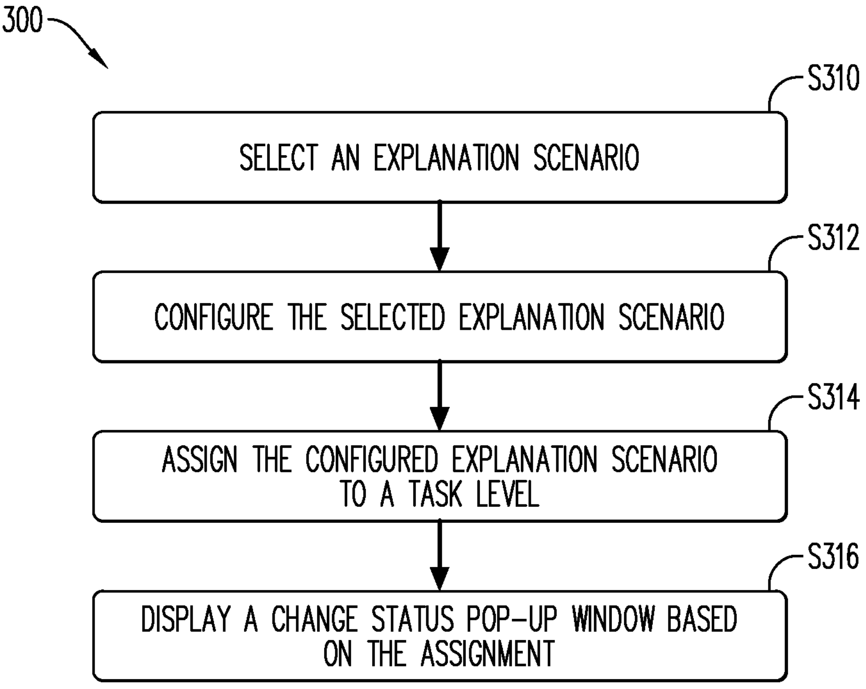
FIG. 3 is a flow diagram of a process according to some embodiments.

FIG. 3 illustrates a process 300 for tracking reasons for status change explanations in accordance with an example embodiment. The process 300, and other processes described herein, may be performed by a database node, a cloud platform, a server, a computing system (user device), a combination of devices/nodes, or the like, according to some embodiments. In one or more embodiments, the system architecture 200 may be conditioned to perform the process 300, and other processes described herein, such that a processing unit 1735 (FIG. 17) of the system architecture 200 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

The process 300 described by FIG. 3 is a high level description, and further details are described below with respect to FIGS. 4-16. Initially at S310, an explanation scenario is selected from a plurality of explanation scenarios at the status change explanation tool 204, where each explanation scenario includes one or more configurable parameters. Then, in S312, each parameter is configured for the selected explanation scenario at the status change explanation tool 204, as described further below with respect to FIG. 4. Next, the configured explanation scenario is applied/assigned to a level in a task list of the task scheduling tool 206 in S314, as described further below with respect to FIG. 14. As described further below, the scenario may be automatically applied to a set (and/or sub-set) of tasks. After assignment, the parameters may be displayed in a pop-up window on a user interface display based on the assigned configured explanation scenario in S316 in response to receipt of a request to update a status of a task.

Figure 4:
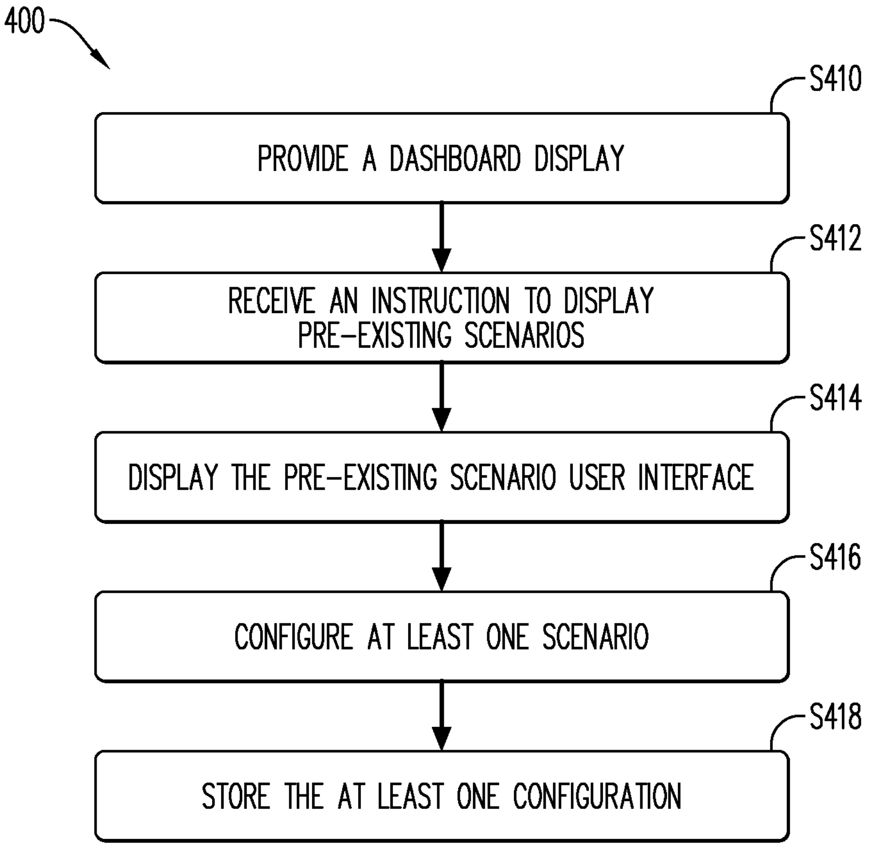
FIG. 4 is a flow diagram of a process according to some embodiments.
Figure 5:
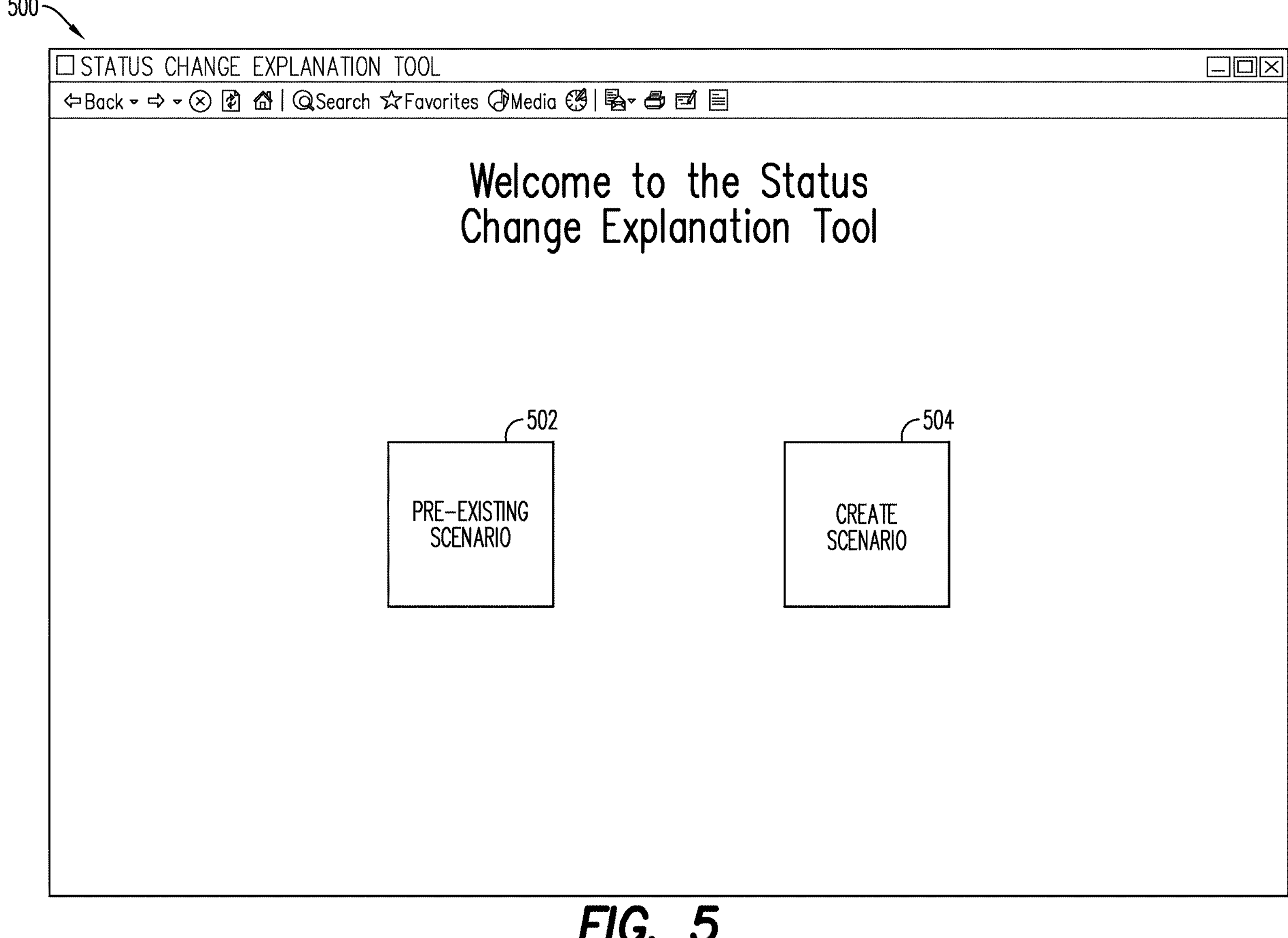
FIG. 5 is a diagram illustrating a user interface according to some embodiments.
Figure 7:
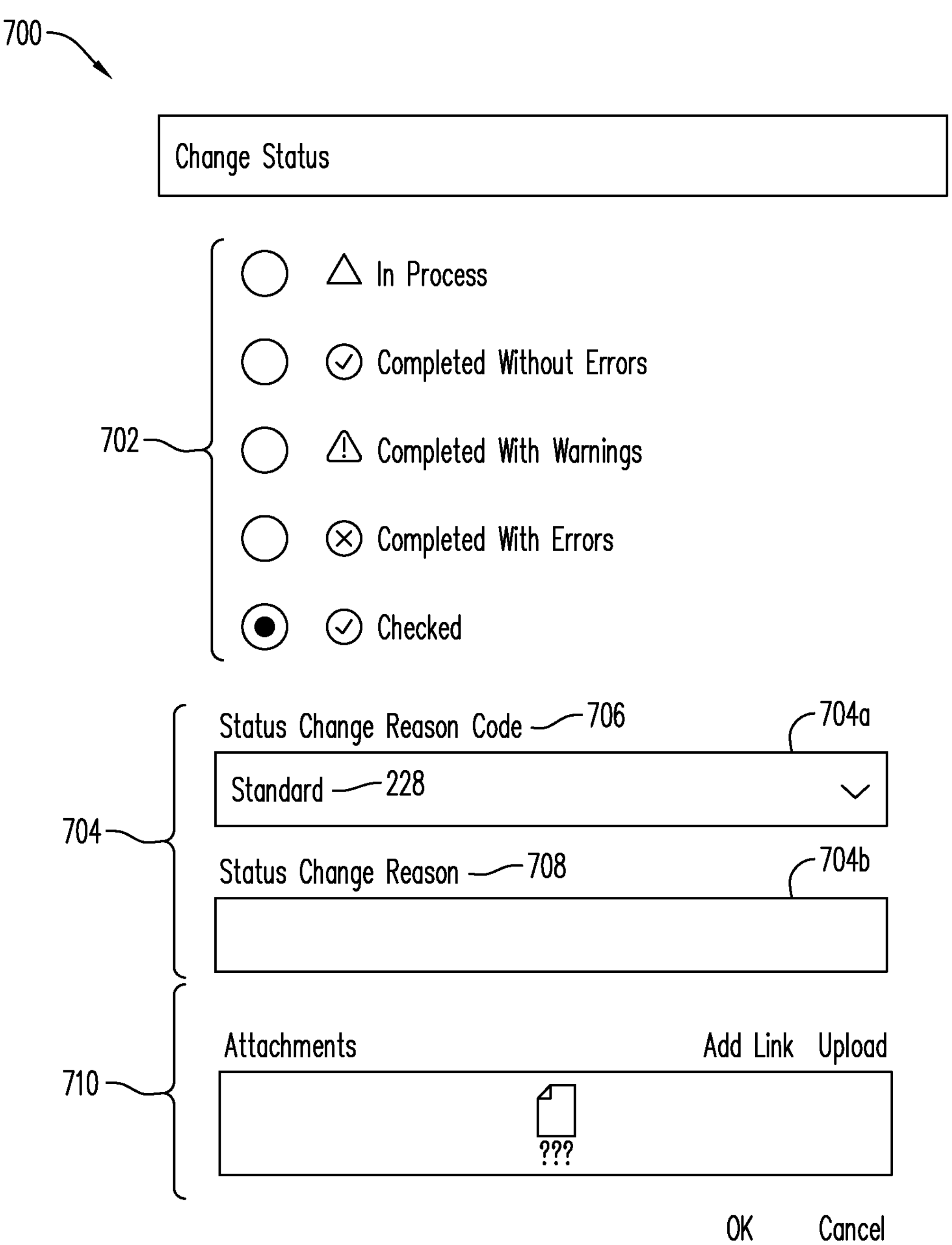
FIG. 7 is a diagram illustrating a user interface according to some embodiments.

FIG. 4 illustrates a process 400 for configuring an explanation scenario in accordance with embodiments.

Prior to the process 400, a user may access the status change explanation tool 204 via the application client 209.

Initially, at S410, the user may be provided with a dashboard display 500 (FIG. 5) in accordance with some embodiments. The dashboard display 500 may include a user selectable "pre-existing scenario" control 502 and a user selectable "create scenario" control 504. While herein the user selectable controls (502, 504) are button icons, other suitable controls may be used. With respect to the process 400, the user may be, as a non-exhaustive example, an administrator.

Then in S412, an instruction to display pre-existing scenarios is received. Receipt of the instruction may include selection of the user selectable "pre-existing scenario" control 502. In response to the received instruction, the pre-existing scenario user interface 600 (FIG. 6) is displayed in S414. The status change explanation tool 204 may retrieve stored pre-existing scenarios 220 from the database 214 and display them on the pre-existing scenario user interface 600.

As described above, when an end-user manually changes a status of a task in the task list provided by the task scheduling tool 206, a change status pop-up window 700 (FIG. 7) may be generated and displayed. The change status pop-up window 700 may include one or more status fields 702 assignable to a given task. The status fields 702 may include, but are not limited to, "In Process", "Completed Without Errors", "Completed with Warnings", "Completed with Errors" and "Checked". Other suitable status fields 702 may be provided. The change status pop-up window 700 may also include one or more explanation fields regarding an explanation for the status change. Conventionally, the explanation field was a free-form text field. Pursuant to embodiments, and as described further below, the one or more explanation fields 704 include a pre-defined status change reason code field **704*a* for a status change reason code parameter 706 and a status change reason comment field 704*b* for a status change reason parameter 708. The change status pop-up window may also include an Attachment parameter 710, described further below with respect to FIG. 16. The scenario 220 is a status change explanation scenario and when configured, defines how the explanation fields 704 and respective parameters 706/708 are displayed on the change status pop-up window 700. The user may select a configured status change explanation scenario and map the selected configured status change explanation scenario to a particular task, as described further below with respect to FIG. 14. As shown in FIG. 6, there are multiple options for how the explanation fields 704 and respective parameters 706/708 are displayed on the pop-up window. The scenarios 220** include, but are not limited to, "Hidden", "Only Comment", "Optional", "Mandatory (DEFAULT-Current)", "Mandatory-ALL", "Overdue" and "Severe Status-Comment Only").

The pre-existing scenarios 220 may be displayed on the pre-existing scenario user interface 600 as a table 602. In this way, the user may configure multiple scenarios at once. It is noted that the user may also change the configuration as needed via this interface 600. The table 602 may include for each pre-existing scenario 220, a customer 604, and a configurable reason code 606 and configurable comment 608. Each of the configurable reason code 606 and configurable comment 608 may be configured for a task status change value 610, a task status change condition 612 and an approval status change 614. The task status change value 610 may depend on the target task and the status value. The task status change value 610 may include the status fields 702 described above with respect to FIG. 7. The task status change condition 612 relates to the timing of the task status change and whether the task is not completed in pre-defined amount of time. As a non-exhaustive example, in a case the task completion is delayed, the user may want the status change reason code field and/or status change reason comment field to be optional. The approval status change 614 may depend on the change being approved 614*a* or rejected 614*b* by another party (e.g., a manager). As a non-exhaustive example, in a case the status change is approved, the user may want the status change reason comment field to be hidden.

Figure 16:
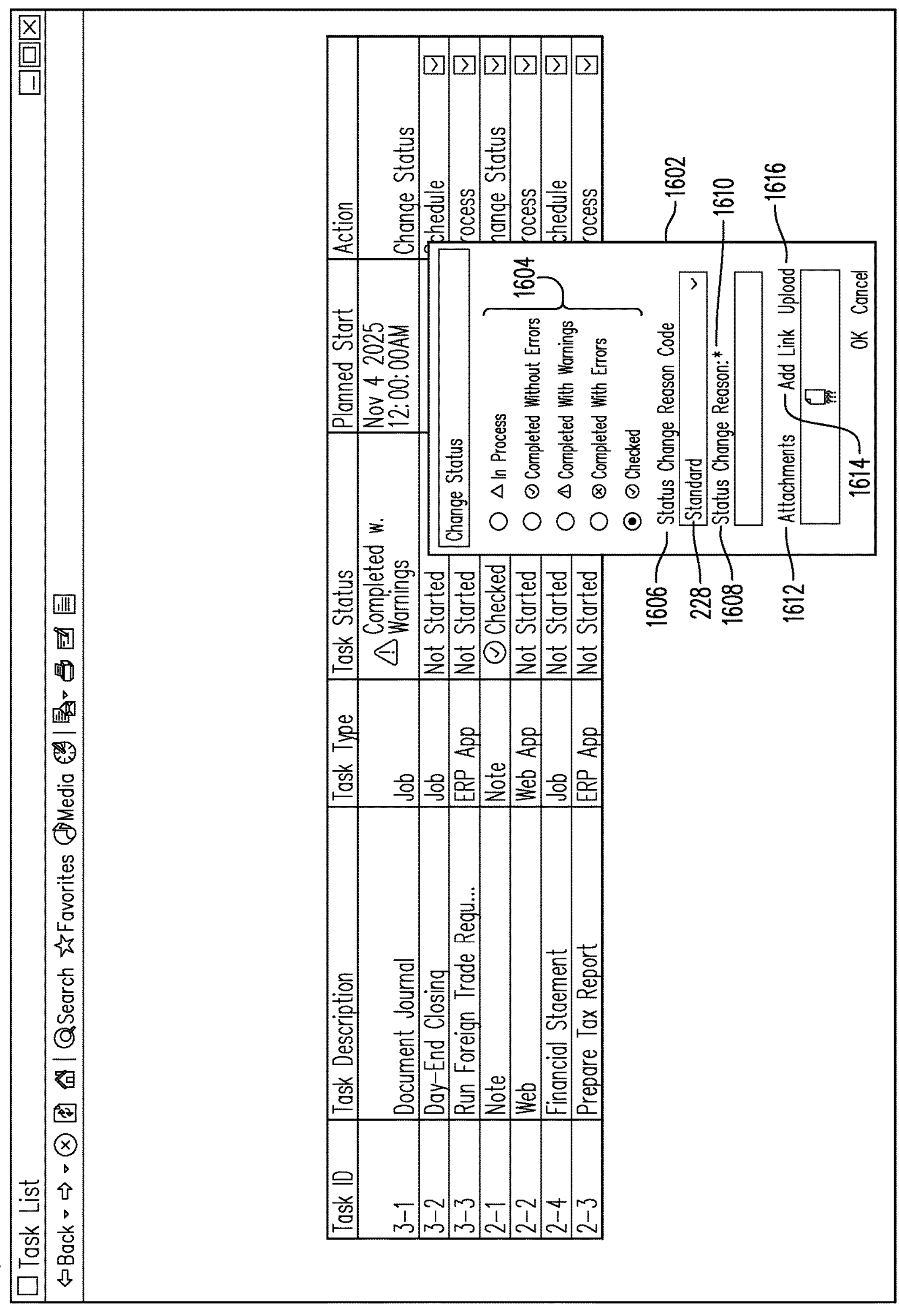
FIG. 16 is a diagram illustrating a user interface according to some embodiments.

Turning back to the process 400, in S416, at least one scenario is configured. Configuration includes selection, for each scenario, of task status change values 610, task status change conditions 612, and approval status changes 614. The selection may be via a drop-down menu of values including, but not limited to, "None (hidden)", "Mandatory" and "Optional". While drop-down menus are shown herein, selection may be via any other suitable selection process. As a non-exhaustive example, for the change status pop-up window 700 in FIG. 7, the reason code value 228 is "Standard", the Status Change Reason Code is "Optional" for the status field 702 changed to "Checked", as indicated by the missing asterisk 1610 (FIG. 16), and the Status Change Reason Comment is "Mandatory" for the status field 702 changed to "Checked," as indicated by the present asterisk 1610 (FIG. 16). The configured scenario(s) is stored in S418.

Although not shown, in response to receipt of an instruction to create new scenarios via selection of the "create scenarios" control 504, the status change explanation tool 204 may generate a user interface including fields to receive a user-created scenario. The user may then configure the user-created scenario as described above with respect to S416. The user-created scenario may be added to the pre-existing scenarios or may stand-alone.

Figure 8:
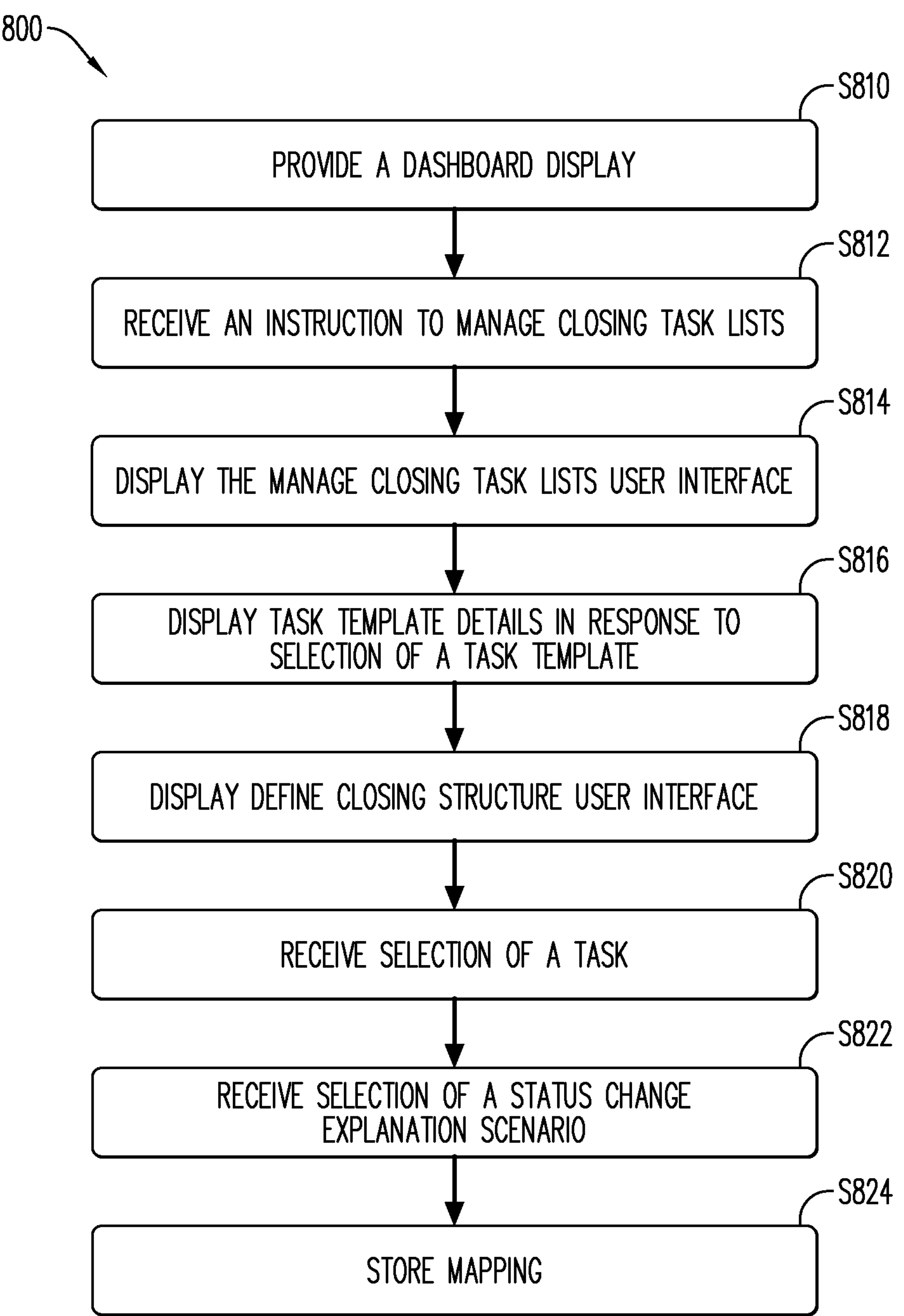
FIG. 8 is a flow diagram of a process according to some embodiments.

After the configured scenario(s) is stored in the table 602 in S418, the configured scenario(s) may be mapped to at least one task as described by process 800 (FIG. 8).

Prior to the process 800, a user may access the task scheduling tool 206 via the application client 209.

Figure 9:
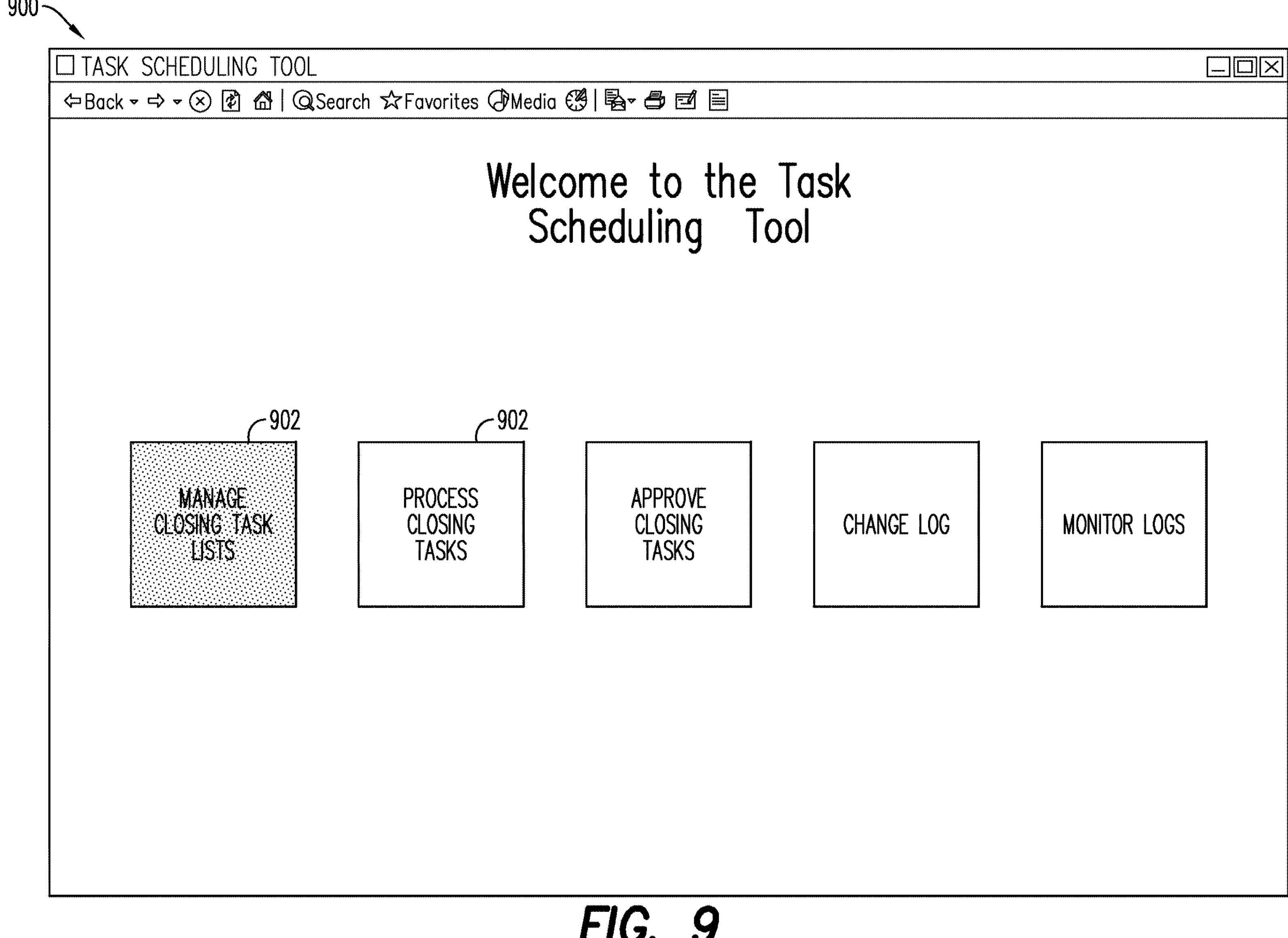
FIG. 9 is a diagram illustrating a user interface according to some embodiments.
Figure 10:
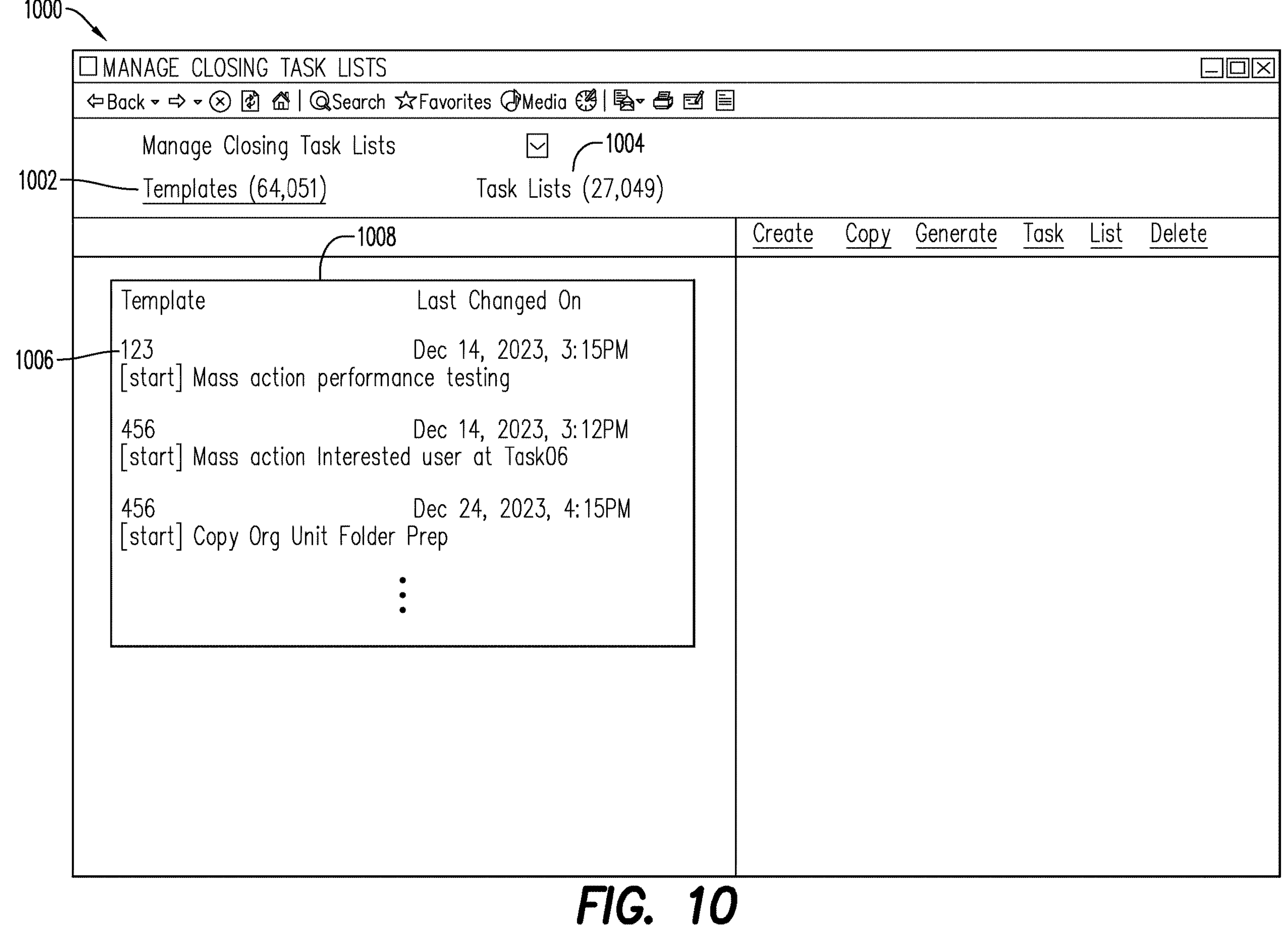
FIG. 10 is a diagram illustrating a user interface according to some embodiments.

Initially, at S810, the user may be provided with a dashboard display 900 in accordance with some embodiments, as described below with respect to FIG. 9. The dashboard display 900 may include a plurality of user selectable controls 902. The user selectable controls 902 may include, but are not limited to, "Manage Closing Task Lists", "Process Closing Tasks", "Approve Closing Tasks", "Change Log", "Monitor Logs". While herein the user selectable controls 902 are button icons, other suitable controls may be used. With respect to the process 800, the user may be, as a non-exhaustive example, an administrator.

At S812, an instruction to "Manage Closing Task Lists" is received. Receipt of the instruction may include selection of the user selectable Manage Closing Task Lists control 902, as indicated by the shaded control in FIG. 9. In response to the received instruction, the Manage Closing Task Lists User Interface 1000 (FIG. 10) is displayed in S814.

Pursuant to some embodiments, the Manage Closing Task Lists User Interface 1000 may include a Templates control 1002 and a Task Lists control 1004. Herein the Templates control 1002 and the Task Lists control 1004 are links. Selection of the Templates control 1002 may result in the display of one or more selectable task templates 1006 in a task section 1008, as shown herein. The user may create a task list via selection of the Templates control 1002. Selection of the Task Lists control 1004 may result in the display of one or more previously saved task lists.

Figure 11:
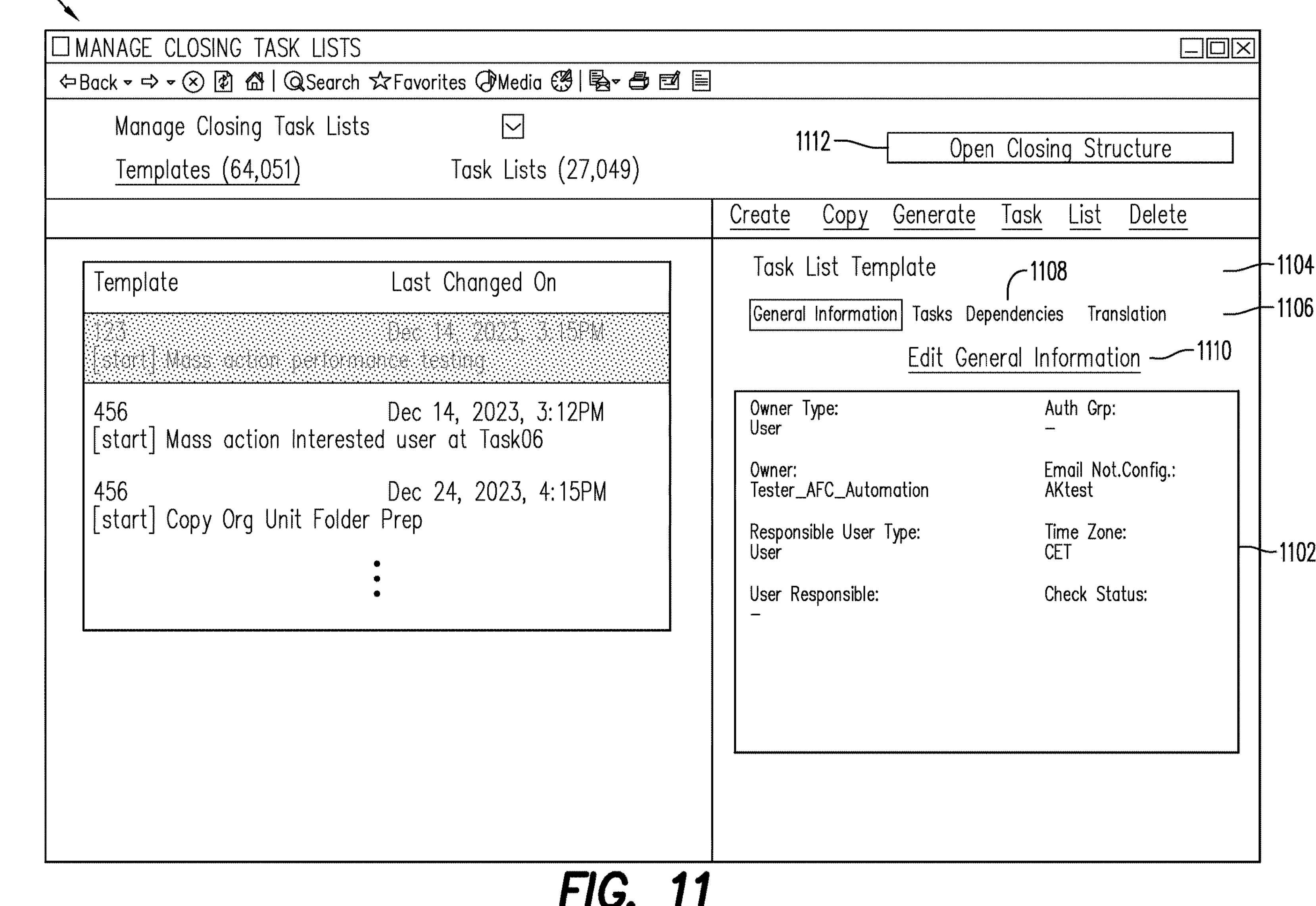
FIG. 11 is a diagram illustrating a user interface according to some embodiments.
Figure 12:
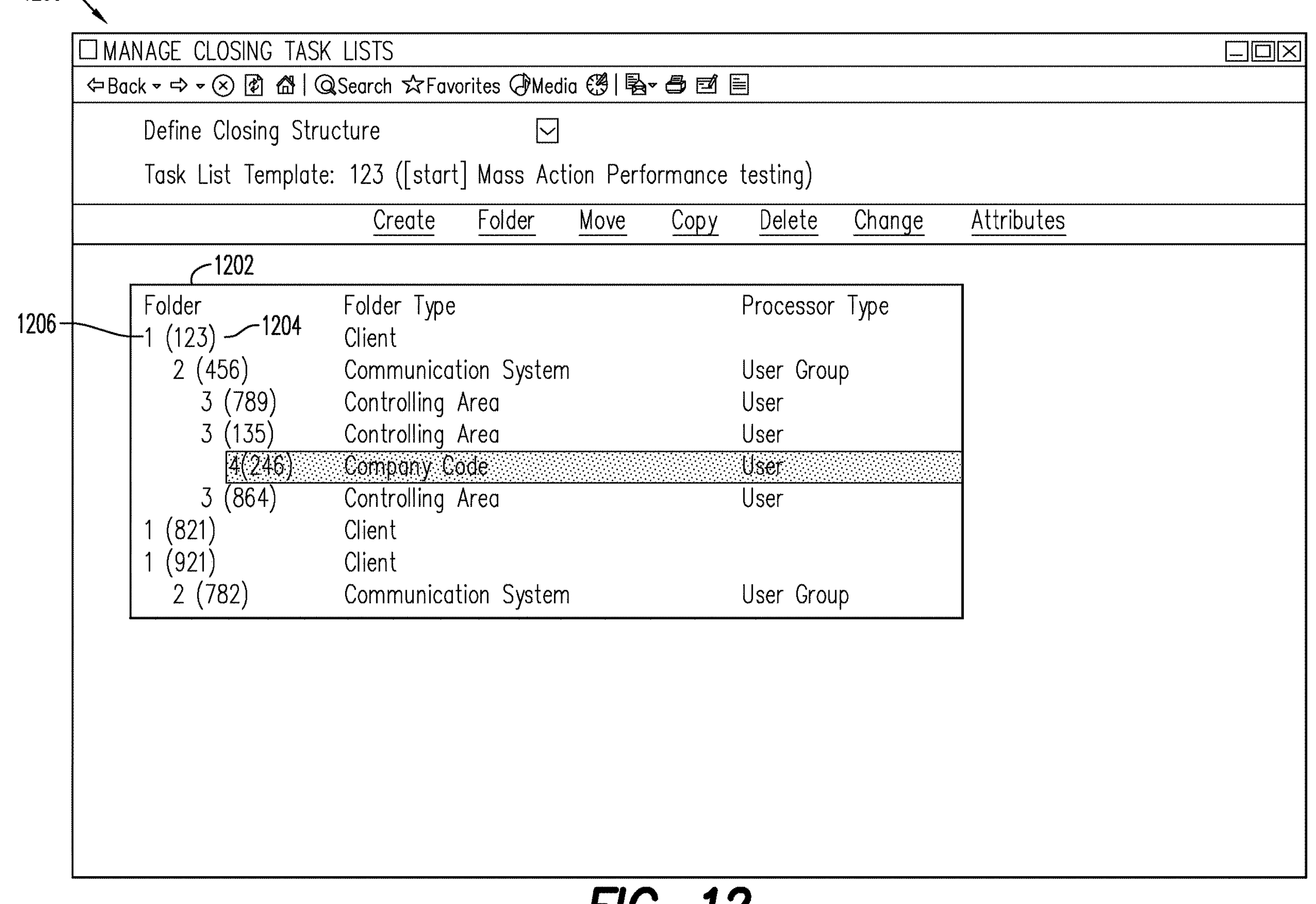
FIG. 12 is a diagram illustrating a user interface according to some embodiments.
Figure 13:
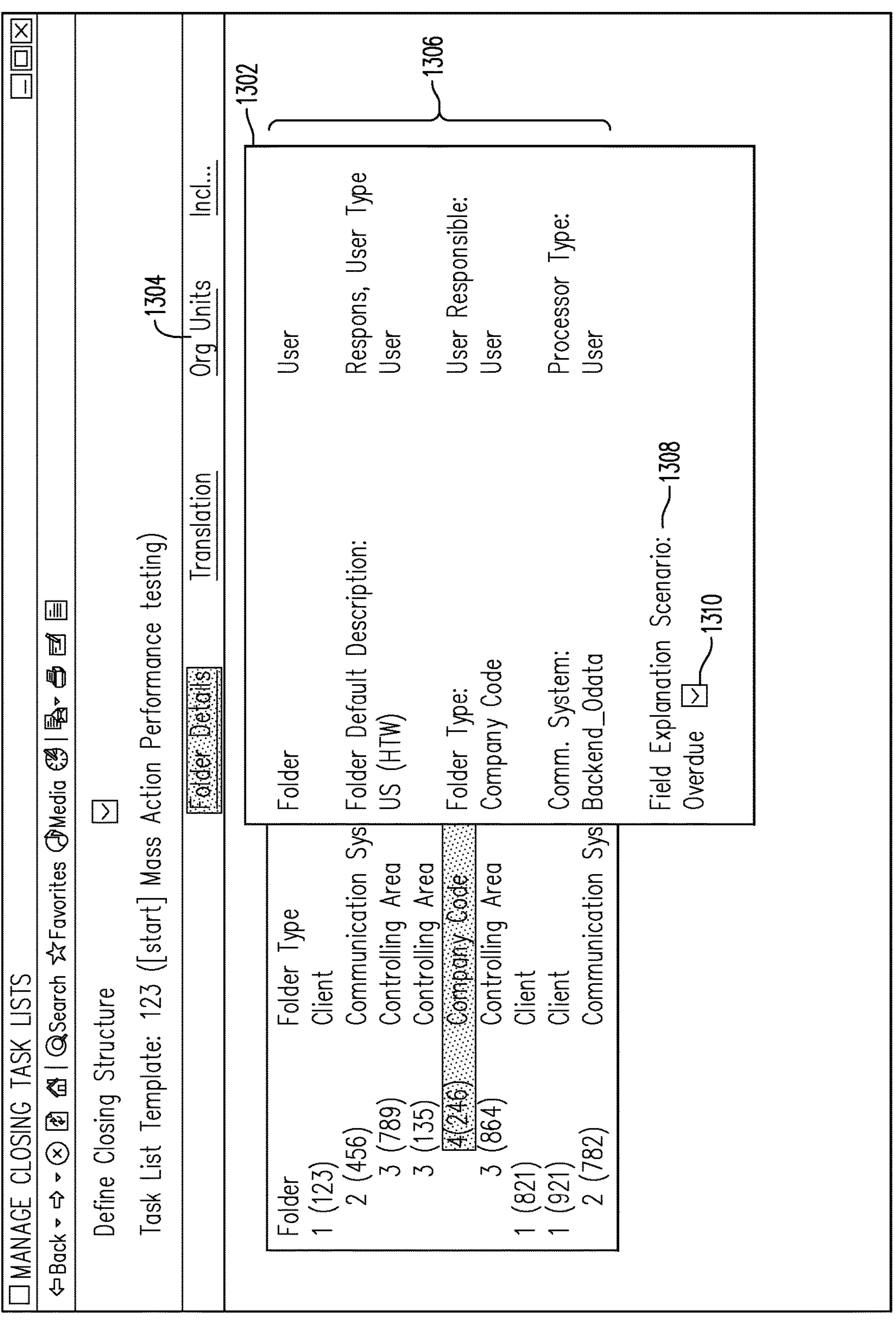
FIG. 13 is a diagram illustrating a user interface according to some embodiments.

Then, in S816, in response to selection of a task template 1006, task template details 1102 (FIG. 11) are displayed in a Task List Template section 1104. In FIG. 11, the selected task template 1006 is shaded. Other suitable selection indicators may be used. The Task List Template section 1104 may include a menu bar 1106 with one or more menu items 1108. Non-exhaustive examples of menu items 1108 include "General Information," "Tasks," "Dependencies", and "Translation." In FIG. 11, the "General Information" menu item is selected as indicated by the shading. Other suitable selection indicators may be used. Selection of the "General Information" menu item 1108 results in the display of information about the selected task template including, but not limited to, Owner type, Owner, Responsible User Type, User Responsible, Authorization Group, Email Notification Configuration, Time Zone, and Check Status. The user may edit the general information via selection of an "Edit General Information" link 1110.

Next, in S818, in response to selection of an Open Closing Structure icon 1112, a Define Closing Structure User Interface 1200 (FIG. 12) is displayed. The Define Closing Structure User Interface 1200 may include a task list 1202. The task list 1202 may include one or more tasks represented by a folder identifier 1204. The folders are collections of tasks with pre-defined parameters. As described further below, the user defines for one or more folders how the reason codes and reason comments in the pop-up window behave for all of the tasks below this level, for example. The task list 1202 may be organized as a hierarchy showing dependencies of the tasks. A task may have one or more dependent tasks depending therefrom. It is noted that a task may have no dependent tasks (e.g., "Task 821"). A hierarchy level indicating dependencies may be marked by a hierarchy level indicator 1206. As a non-exhaustive example, here, the task represented by folder identifier 123 ("Task 123") has a hierarchy level indicator of "1". Here, a hierarchy level indicator of "1" indicates that the task is not dependent on other tasks. Task 123 has dependent task 456, which has a hierarchy level indicator of "2". Dependent task 456 has three dependent tasks dependent thereon (789, 135 and 864), each with a hierarchy level indicator of "3". Further, dependent task 135 has dependent task 246 dependent thereon with a hierarchy level indicator of "4". It is noted that while four hierarchy level indicators are shown herein, other suitable indicators may be used.

Selection of a task of any level is received in S820. Here, dependent task 246 is selected as indicated by the shading in FIG. 12. Selection of the task may result in the display of a Folder Details section 1302 (FIG. 13) including information for the selected task folder. It is noted that while in some embodiments, selection of the task may default to display of the Folder Details, in other embodiments, selection of the task may default to display of other menu items 1304, including but not limited to, translation, org units, etc. The Folder Details section 1302 may include folder information 1306. Non-exhaustive examples of parameters included in the folder information 1306 are Folder Default Description, Folder Type, Communication System, Responsible User Type, User Responsible and Processor Type. The Folder Details section 1302 may also include a Field Explanation Scenario parameter 1308. The Field Explanation Scenario parameter 1308 may include a drop down menu 1310 or other suitable display of status change explanation scenarios 220. In S822, selection of a status change explanation scenario is received. Selection of the status change explanation scenario maps the status change explanation scenario stored in the database 214 to the task, and the mapping is stored in a scenario-task map 230 in the database 214 in S824. Pursuant to embodiments, the mapping selected for a given task at a given task level may be applied to all of the other tasks dependent on the given task in the hierarchy. As a non-exhaustive example, in a case the mapping is set at hierarchy level 2, the mapping is applied to level 2, level 3, level 4, etc. that depend from that level 2 task. In some embodiments, the mapping selected for a given task may be applied to all of the other tasks in the hierarchy as a default setting and a box or other indicator may be selected to change the status change explanation scenario for any of the individual tasks in the hierarchy. In some embodiments, the mapping selected for a given task may be applied to all of the tasks in the hierarchy related to the given task or all of the tasks from which the given task depends in the hierarchy.

Figure 14:
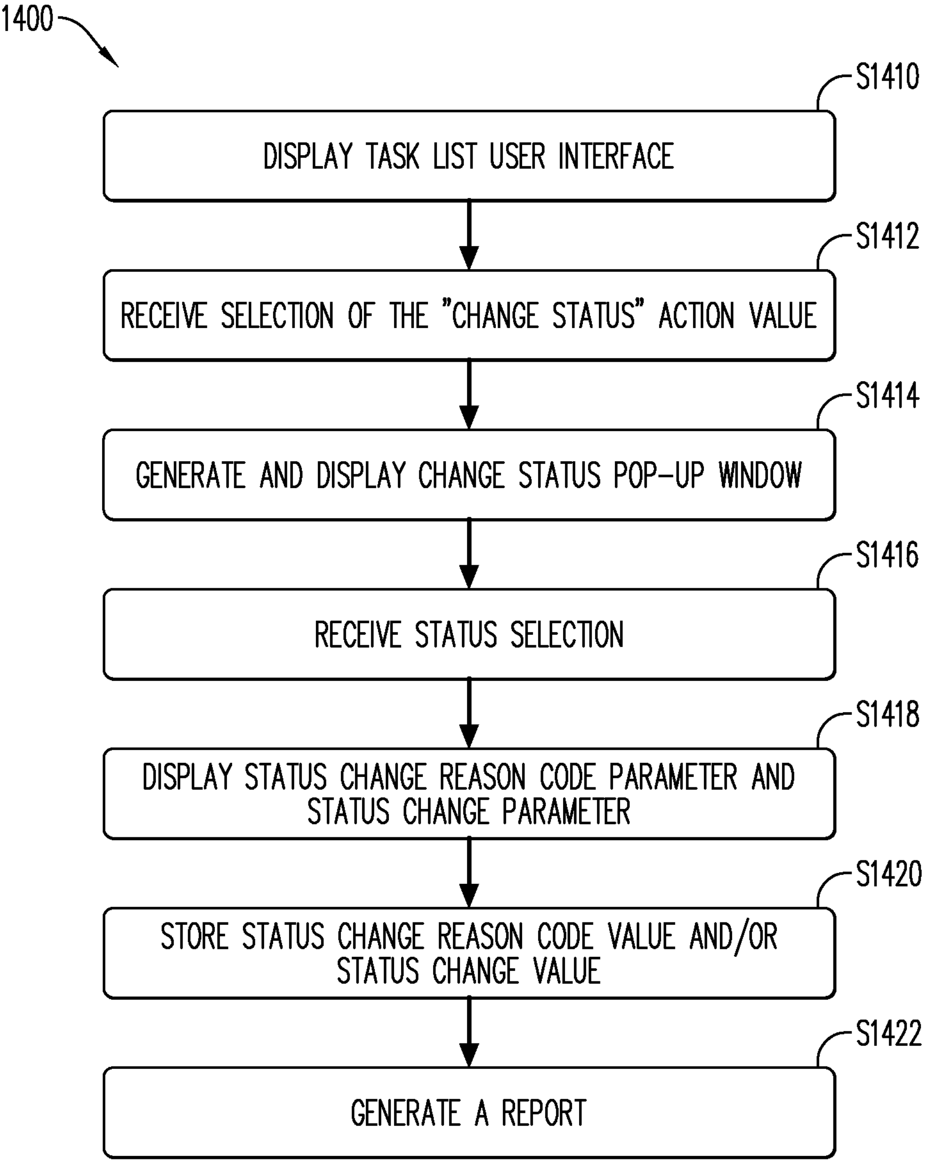
FIG. 14 is a flow diagram of a process according to some embodiments.
Figure 15:
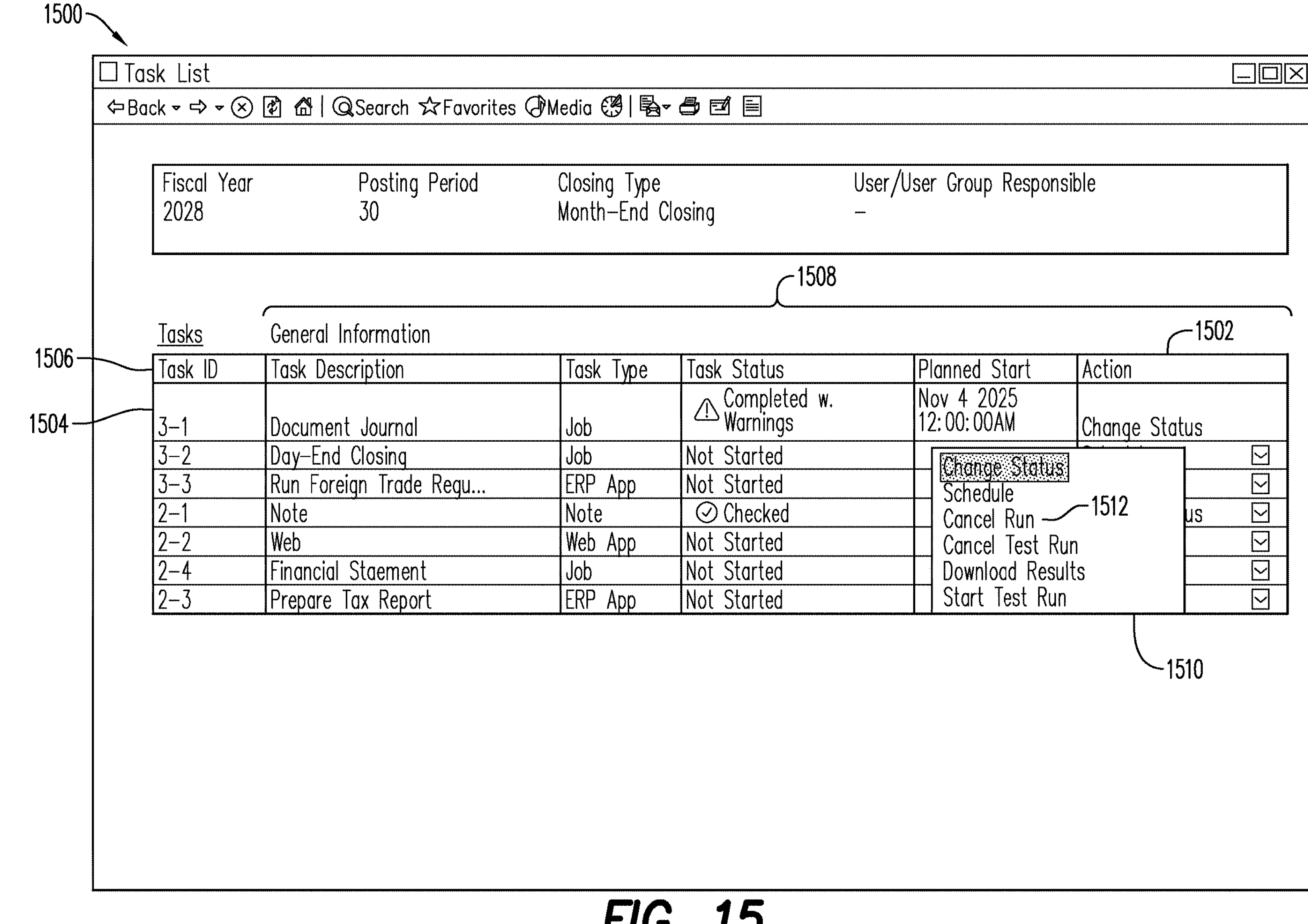
FIG. 15 is a diagram illustrating a user interface according to some embodiments.

After the mapping is stored, an end user may manually update the status of a task in a task list as described by process 1400 (FIG. 14).

Prior to the process 1400, an end user may access the task scheduling tool 206 via the application client 209 and be presented with the dashboard display 900 described above with respect to FIG. 9. An instruction to process closing tasks may be received in response to the end user selection of the Process Closing Tasks control 902.

In response to the received selection, a list of stored tasks for this end user is displayed on a Task List User Interface (UI) 1500 (FIG. 15) in S1410. The list of tasks may also be organized by closing type (e.g., Month-End Closing, Fiscal Year-End Closing, Calendar Year-End Closing, etc.). The Task List UI 1500 may include a table 1502 including one or more tasks 1504 organized by Task ID 1506. The table 1502 may include a plurality of parameters 1508 for each task 1504. The parameters 1508 may include, but are not limited to, Task Description, Task Type, Task Status, Planned Start, and Action. The Action parameter 1508 may include a drop-down menu 1510 by which the user may select one of a plurality of action values 1512 for the given task. The action values 1512 may include, but are not limited to, "Change Status", "Schedule", "Cancel Run", "Cancel Test Run", "Download Results", and "Start Test Run".

For a given task, the selection, via the end user, of the "Change Status" action value 1512 is received in S1412.

In response to receipt of the selected "Change Status" action value 1512, a change status pop-up window 1602 (FIG. 16) is generated and displayed in S1414. The change status pop-up window 1602 may include one or more selectable statuses 1604. The selectable statuses 1604 include, but are not limited to, "In Process", "Completed Without Errors", "Completed with Warnings", "Completed with Errors" and "Checked". Then, in S1416, selection of a status is received. In response to the selection, a Status Change Reason Code parameter 1606 and a Status Change Reason parameter 1608 may be displayed in S1418. The display of at least one of the Status Change Reason Code parameter 1606 and the Status Change reason parameter 1608 is determined based on: 1. the mapping between the task and the Change Status Explanation Scenario, 2. the configuration for the Change Status Explanation Scenario and the selected status, and 3. whether a value for each of these parameters may be optional or required in a case the parameter is displayed. It is noted that the status change reason code values 228 may be populated based on the given task. Pursuant to some embodiments, a required value may be indicated via an asterisk 1610 or other suitable indicator. As described above, the change status pop-up window 1602 may also include an Attachments parameter 1612, whereby an end user may add a link 1614 or upload data 1616 to provide additional information regarding the Status Change Reason Code and/or Status Change Reason. The Status Change Reason Code value and/or the Status Change Reason value are stored in S1420.

Following storage of the status change reason code value and/or the status change reason value, a report 232 may be generated in S1422. The report 232 may be generated by the task scheduling tool 206 or any other suitable reporting tool. The report 232 may be transmitted to the user 218 or any other suitable system or tool. Pursuant to embodiments, the report 232 may include one or more tasks and may be filtered based on the status change reason code value.

Figure 17:
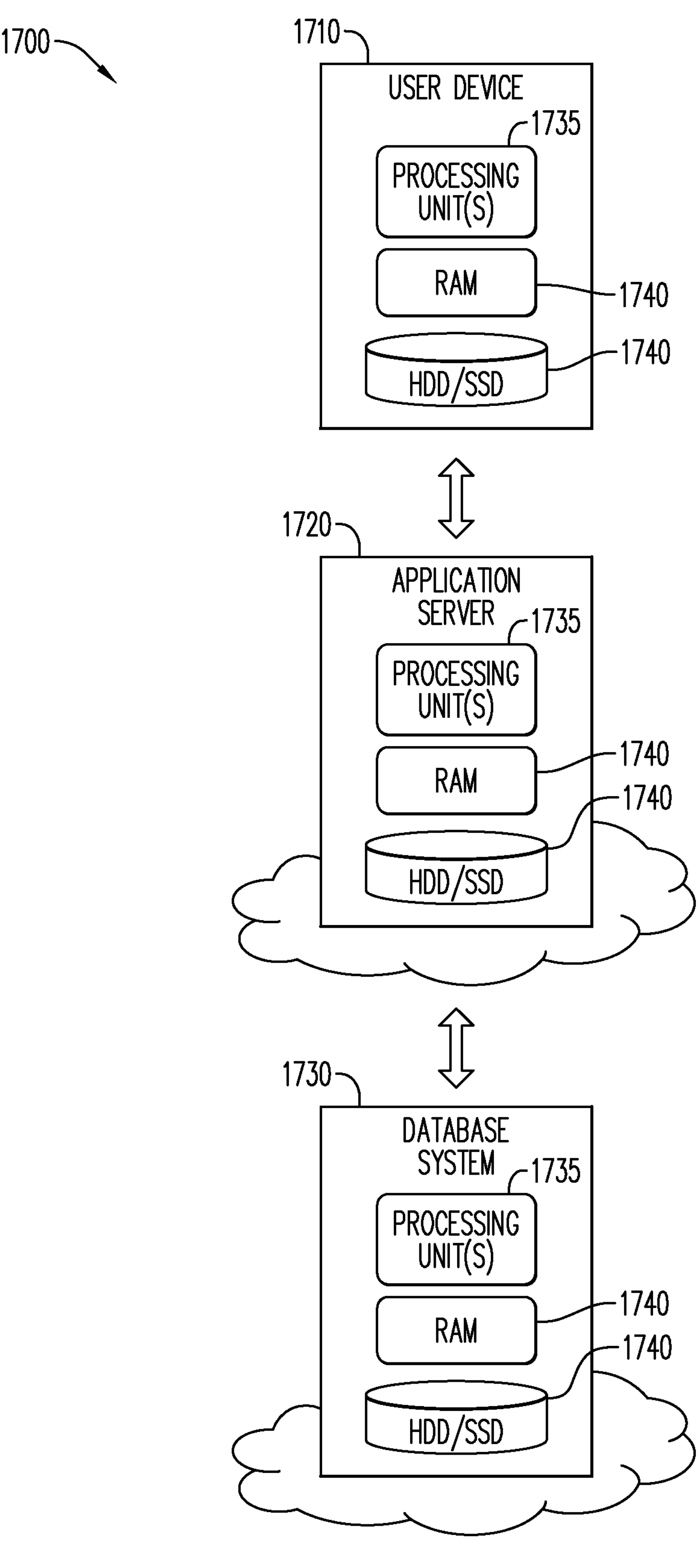
FIG. 17 is a block diagram of a cloud-based database deployment architecture according to some embodiments.

FIG. 17 illustrates a cloud-based database deployment 1700 according to some embodiments. The illustrated components may reside in one or more public clouds providing self-service and immediate provisioning, autoscaling, security, compliance and identity management features.

User device 1710 may interact with applications executing on one of the cloud application server 1720, for example via a Web Browser executing on user device 1710, in order to create, read, update and delete data managed by database system 1730. Database system 1730 may store data as described herein and may execute processes as described herein to cause the execution of the status change explanation tool 204 for use with the user device 1710. Cloud application server 1720 and database system 1730 may comprise cloud-based compute resources, such as virtual machines, allocated by a public cloud provider. As such, cloud application server 1720 and database system 1730 may be subjected to demand-based resource elasticity. Each of the user device 1710, cloud application server 1720, and database system 1730 may include a processing unit 1735 that may include one or more processing devices each including one or more processing cores. In some examples, the processing unit 1735 is a multicore processor or a plurality of multicore processors. Also, the processing unit 1735 may be fixed or it may be reconfigurable. The processing unit 1735 may control the components of any of the user device 1710, cloud application server 1720, and database system 1730. The storage device 1740 may not be limited to a particular storage device and may include any known memory device such as RAM, ROM, hard disk, and the like, and may or may not be included within a database system, a cloud environment, a web server or the like. The storage device 1740 may store software modules or other instructions/executable code which can be executed by the processing unit 1735 to perform the process shown in FIGS. 3, 4, 8 and 14. According to various embodiments, the storage device 1740 may include a data store having a plurality of tables, records, partitions and sub-partitions. The storage device 1740 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:

a memory storing processor-executable program code; and a processing unit to execute the processor-executable program code to cause the system to:

select an explanation scenario from a plurality of explanation scenarios, wherein each explanation scenario includes one or more configurable explanation field parameters;

configure each explanation field parameter for the selected explanation scenario, wherein configuration defines how one or more explanation fields and respective one or more explanation field parameters are displayed on a change status pop-up window of an interactive user interface display, wherein the configuration includes: a hidden display or unhidden display for each explanation field, a display condition for each explanation field, and at least one rule associated with each explanation field;

apply the configured explanation scenario to at least one process in a process list, wherein the configured explanation scenario is independent of any process in the process list;

receive a request to change a status of the at least one process;

generate, via a computing device, the change status pop-up window of the interactive user interface display, the generated change status pop-up window of the interactive user interface display including a plurality of selectable statuses;

receive, at the interactive user interface display via the computing device, a user selection of one status of the plurality of selectable statuses, wherein the selectable statuses include a pre-defined list of reason codes allowing the user to enter an explanation on task status changes displayed on the computing device;

in response to the selected status, update, via the computing device, the interactive user interface display of the change status pop-up window to include at least a first explanation field based on the unhidden display configuration for the first explanation field;

in response to the task status changes, display on the interactive user interface display via the computing device, the user selection to approve or reject the status changes; and automatically display the explanation field parameters on the generated change status pop-up window based on the applied configured explanation scenario and in response to the received request.

2. The system of claim 1, wherein the configurable explanation field parameters are linked to at least one of a status change code and a status change free-form field.

3. The system of claim 2, wherein the at least one of the status change codes are pre-defined.

4. The system of claim 2, wherein the status change free-form field receives free-form values.

5. The system of claim 1, wherein the process list is organized with at least one sub-process for a process and each process is in a level.

6. The system of claim 5, wherein application of the configured explanation scenario to the process applies the configured explanation scenario to each sub-process dependent on the process.

7. The system of claim 1, wherein the explanation scenario is a pre-existing explanation scenario or a create explanation scenario.

8. A computer-implemented method comprising:

selecting an explanation scenario from a plurality of explanation scenarios, wherein each explanation scenario includes one or more configurable explanation field parameters;

configuring each explanation field parameter for the selected explanation scenario, wherein configuration defines how one or more explanation fields and respective one or more explanation field parameters are displayed on a change status pop-up window of an interactive user interface display, and wherein:

the configurable explanation field parameters are linked to at least one of a status change code and a status change free-form field; and the configuration includes: a hidden display or unhidden display for each explanation filed, a display condition for each explanation filed, and at least one rule associated with each explanation field;

applying the configured explanation scenario to at least one process in a process list, wherein the configured explanation scenario is independent of any process in the process list;

receiving a request to change a status of the at least one process;

generating, via a computing device, the change status pop-up window of the interactive user interface display, the generated change status pop-up window of the interactive user interface display including a plurality of selectable statuses;

receiving, at the interactive user interface display via the computing device, a user selection of one status of the plurality of selectable statuses, wherein the selectable statuses include a pre-defined list of reason codes allowing the user to enter an explanation on task status changes displayed on the computing device;

in response to the selected status, updating, via the computing device, the interactive user interface display of the change status pop-up window to include at least a first explanation field based on the unhidden display configuration for the first explanation field;

in response to the task status changes, displaying on the interactive user interface display via the computing device, the user selection to approve or reject the status changes; and automatically displaying the explanation field parameters on the generated change status pop-up window based on the applied configured explanation scenario and in response to the received request.

9. The method of claim 8, wherein the at least one of the status change codes are pre-defined.

10. The method of claim 8, wherein the status change free-form field receives free-form values.

11. The method of claim 8, wherein application of the configured explanation scenario to the process applies the configured explanation scenario to each sub-process dependent on the process.

12. The method of claim 8, wherein the explanation scenario is a pre-existing explanation scenario or a create explanation scenario.

13. The method of claim 8, wherein the process list is organized with at least one sub-process for a process and each process is in a level.

14. A non-transitory computer readable medium having executable instructions stored thereon to perform a method, the method comprising:

selecting an explanation scenario from a plurality of explanation scenario, wherein each explanation scenario includes one or more configurable explanation field parameters;

configuring each explanation field parameter for the selected explanation scenario, wherein configuration defines how one or more explanation fields and respective one or more explanation field parameters are displayed on a change status pop-up window of an interactive user interface display and wherein:

the configurable parameters are linked to at least one of a status change code and a status change free-form field;

the configuration includes: a hidden display or an unhidden display for each explanation field; a display condition for each explanation field, and at least one rule associated with each explanation field;

applying the configured explanation scenario to at least one process in a process list, wherein the configured explanation scenario is independent of any process in the process list;

receiving a request to change a status of the at least one process;

generating, via a computing device, the change status pop-up window of the interactive user interface display, the generated change status pop-up window of the interactive user interface display including a plurality of selectable statuses;

receiving, at the interactive user interface display via the computing device, a user selection of one status of the plurality of selectable statuses, wherein the selectable statuses include a pre-defined list of reason codes allowing the user to enter an explanation on task status changes displayed on the computing device;

in response to the selected status, updating, via the computing device, the interactive user interface display of the change status pop-up window to include at least a first explanation field based on the unhidden display configuration for the first explanation field;

in response to the task status changes, displaying on the interactive user interface display via the computing device, the user selection to approve or reject the status changes; and automatically displaying the explanation field parameters on the generated change status pop-up window based on the applied configured explanation scenario and in response to the received request.

15. The medium of claim 14, wherein the at least one of the status change codes are pre-defined.

16. The medium of claim 14, wherein the status change free-form field receives free-form values.

17. The medium of claim 14, wherein application of the configured explanation scenario to the process applies the configured explanation scenario to each sub-process dependent on the process.

18. The medium of claim 14, wherein the process list is organized with at least one sub-process for a process and each process is in a level.

19. The medium of claim 14, wherein the explanation scenario is a pre-existing explanation scenario or a create explanation scenario.

20. The system of claim 1 further comprising processor-executable program code to cause the system to:

re-use the explanation scenario by applying the configured explanation scenario to a second process in the process list.

* * * * *